R. B. RUDY.
ELECTRIC SIGNAL FOR AUTOMOBILES.
APPLICATION FILED MAR. 3, 1915.

1,172,395.          Patented Feb. 22, 1916.

Witnesses
W. C. Fielding
Byron B. Collings

Inventor
R. B. Rudy, by
Attorney

UNITED STATES PATENT OFFICE.

RAYMOND B. RUDY, OF NIAGARA FALLS, NEW YORK.

ELECTRIC SIGNAL FOR AUTOMOBILES.

1,172,395.   Specification of Letters Patent.   Patented Feb. 22, 1916.

Application filed March 3, 1915. Serial No. 11,707.

*To all whom it may concern:*

Be it known that I, RAYMOND B. RUDY, a citizen of the United States, residing at Niagara Falls, in the county of Niagara and State of New York, have invented certain new and useful Improvements in Electric Signals for Automobiles; and I do hereby declare the following to be a full, clear, and exact description of the invention, such as will enable others skilled in the art to which it appertains to make and use the same.

This invention relates to signal indicators, for vehicles, and has for its object to provide an apparatus of this kind especially adapted for use in connection with automobiles which will be simple in construction, comparatively inexpensive to manufacture, and more efficient in action than those heretofore proposed.

With these and other objects in view the invention consists in the novel details of construction and combinations of parts, more fully hereinafter disclosed and particularly pointed out in the claims.

Figure 1:
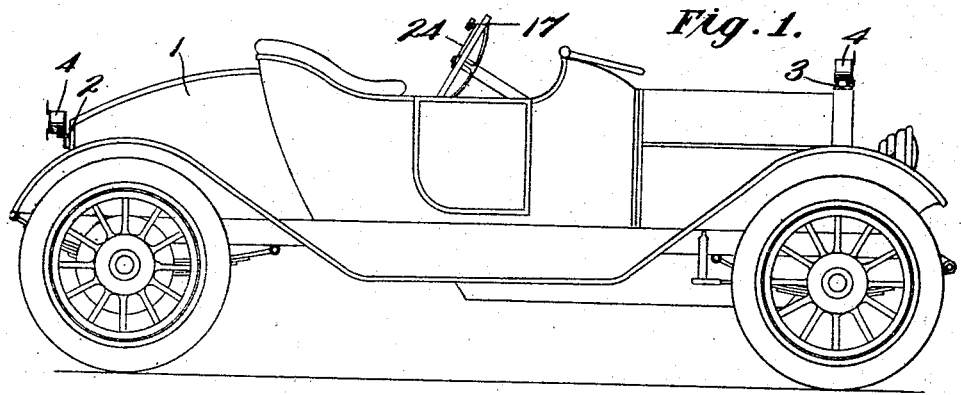
Figure 2:
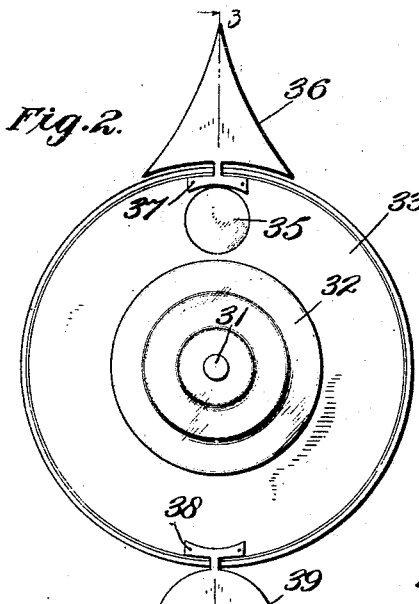
Figure 3:
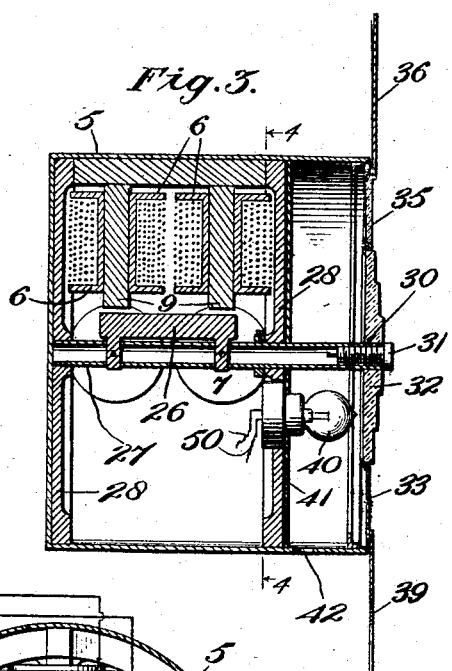
Figure 4:
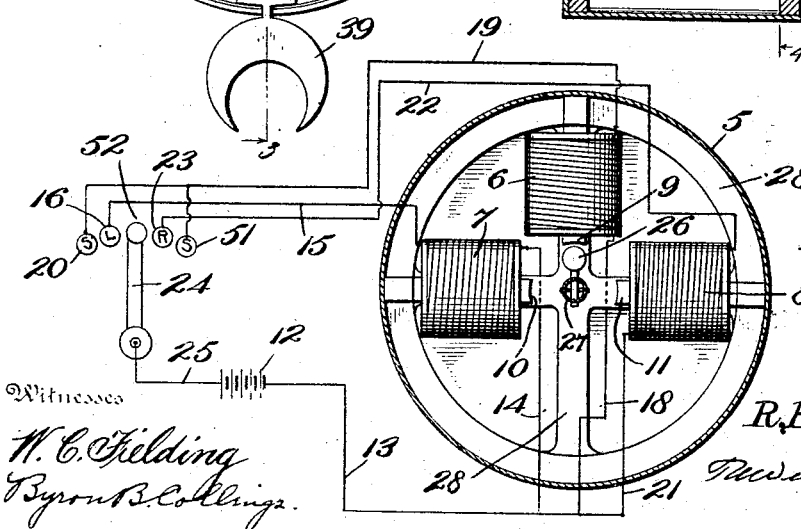

Referring to the accompanying drawings forming a part of this specification in which like numerals designate like parts in all the views,—Figure 1 is a diagrammatic elevational view of an automobile provided with my invention; Fig. 2 is an elevational view of the signal indicator adapted to be attached to the front or to the rear or to both front and rear of the automobile shown in Fig. 1; Fig. 3 is a sectional view taken on the line 3—3 of Fig. 2; and Fig. 4 is a sectional view taken on the line 4—4 of Fig. 3 with the circuits diagrammatically illustrated.

1 indicates any suitable car or vehicle to which is attached as on a rear bracket 2 or on the radiator filling pipe 3 or on both the bracket and filling pipe my signal indicator 4. This indicator consists of any usual outer casing 5 in which are located the electro magnets 6, 7 and 8 having the poles 9, 10 and 11 respectively, associated with the source of current 12 from which leads the wire 13 provided with branch wire 14 passing through the coils of the magnet 7 from which leads the wire 15 to the contact member 16 located on the steering wheel 17 of the vehicle. From the wire 13 also leads the branch connection 18 passing through the coils of magnet 6 from which leads the wire 19 to the contact member 20 also located on the steering wheel 17 of the vehicle. Finally from the wire 13 leads the third branch connection 21 passing through the coils of the magnet 8 from which leads the wire 22 to the contact member 23 likewise located on the steering wheel 17 of the vehicle.

The contacts 16, 20 and 23 are preferably arranged in the arc of a circle, which may be traversed by the lever 24 so as to make circuit with any of said contacts at will, and from said lever 24 leads the wire 25 back to the battery 12. Accordingly it is obvious that by manipulating the lever 24 a circuit can be closed through any one of the magnets 6, 7 or 8 at will. The poles 9, 10 and 11 of said magnets are further located on the circumference of a circle as will be clear from Fig. 4, and at the center of said circle is pivoted the armature 26, adapted to be attracted to any one of the poles 9, 10 and 11 when the corresponding circuit is made. A convenient means for pivoting the armature 26 is a pipe 27 one end of which is journaled in the plate 28 with which the casing 5 is provided, and the other end of which projects through a plate 28 with which said casing 5 is also provided. The extreme end of the pipe or tube 27 may be conveniently split as indicated at 30 and the said split end provided with a conical screw plug such as 31 so as to expand the same on the inside of a perforation with which the glass member 32 is provided. By this means the glass center piece, or red bulls eye 32 is made to revolve with the armature 26 and tube 27. Fitted around the outer circumference of the said bulls eye 32 is the annular metallic ring member 33 provided with a circular opening in which is fitted the clear glass disk 35. Accordingly when the said armature 26 is moved the said members 32, 33 and 35 will correspondingly move. On a line passing through the centers of the bulls eye 32 and clear glass 35 is the arrow or other indicator 36 rigidly secured to the metal ring 33 as indicated at 37. At 180° from the arrow or indicator 36 is likewise rigidly secured as at 38 the crescent or other shaped device 39. It accordingly follows that when any of the circuits are closed through the contacts 16, 20 or 23, the corresponding magnets 7, 6, or 8 will be energized and the armature 26 brought opposite the corresponding pole 10, 9 or 11, whereupon the arrow 36 and crescent 29 will stand in a plane passing through the said pole armature and the said arrow and crescent. In other words if the circuit is through the magnet 6 the contact 20 may be marked with the letter S as indicated, and the vertical position of the arrow 36 will indicate stop. On the other hand if the contact 16 is marked L to indicate left, then when the circuit is made through the magnet 7 the movement of the arrow 36 toward the left will indicate that the vehicle is turning or going to turn toward the left. In the same way by marking the contact 23 with the letter R when the circuit is made through the magnet 8 the movement of the arrow 36 to the right as seen in Figs. 2 and 4 will indicate that the vehicle is moving toward the right or is about to move in that direction. Again, when no circuit at all is made the weight of the arrow is so chosen that it will gravitate to its lowest position, whereupon it will point vertically downward and in this position it will indicate neutral.

In order that the signal may be operative at night, I preferably provide a lamp such as 40 on the inside of the casing 5, and in order that the light from this lamp may be sufficiently brilliant to light up the disks 32 and 35 in all positions I may provide a metallic or other mirror 41 to reflect the said light. Consequently at night the light shining from said lamp 40 and said mirror 41 will cause the clear glass light 35 to appear to be revolving around the red bulls eye 32, although of course the light itself will be stationary. I may further provide a slot such as 42 immediately below the lamp 40 in order to shed light upon the license tag or number.

The contact lever 24 is preferably pivoted on the steering wheel 17 as indicated and the circuits shown in Fig. 4 are preferably duplicated for the front signal 4 so that when circuits are made as above indicated duplicate signals will be displayed at front and rear, but of course a suitable switch not shown may be provided if desired to cut out the front signals.

It will be seen from the above disclosure that my device will serve to indicate to other vehicles and to pedestrians as well as to the traffic policemen on corners whether the driver intends to go straight ahead or turn to the right or to the left or to stop. It will further be seen that the signals giving the above information can be simultaneously displayed at the front and the rear of the vehicle.

In addition to the above the rear signal is combined with the tail lamp which the law requires shall be carried, in that the red bulls eye 32 serves as a tail lamp. In order that it may be kept shining at all times, the circuits 50 through the lamp 40 are kept permanently closed through the source of current by wires not shown, but of course may be cut out at any time by suitable means not illustrated.

It will further be seen that the signal movements are all positively produced so that the danger of a failure to operate is minimized. The contact lever 24 being located on the steering wheel, is in easy reach of the operator's thumb so that the signal involves no difficulty or trouble in its operation, and will remain in the position set until the circuit is broken and it is returned to its neutral position. In order that the signal for stop may be quickly produced no matter where the lever 24 may be, I provide an extra contact 51 on the steering wheel and immediately next to the contact 23 so that should the circuit through contact 23 be made the lever 24 can be turned immediately to the contact 51 to indicate stop without having to move all the way over to contact 20. Another important point of my invention resides in the fact that the stop contacts 20 and 51 are so located that before they can be reached from a neutral position 52, the contacts 16 or 23 must be passed over and the magnets 7 or 8 energized. In other words should the armature 26 be at its lowest or neutral position, it is very desirable to energize the magnets 7 or 8 in order to raise it to its highest position illustrated in Fig. 4 and therefore when it is desired to indicate stop when the arrow 36 is pointing vertically downward, current must be passed first through the magnets 7 or 8, before it is passed through the magnet 6, and the energizing of one of the magnets 7 or 8 therefore first attracts the armature 26 and greatly aids in bringing it to its highest or stop position illustrated in Fig. 4. The magnets do not occupy but a fraction of the space inside the casing 5 and therefore ample room is afforded for wiring.

It is obvious that those skilled in the art may vary the details of construction, as well as the arrangement of parts without departing from the spirit of my invention and therefore I do not wish to be limited to the above disclosure except as may be required by the claims.

What I claim is:

1. In a signal for automobiles the combination of a casing; three electro-magnets in said casing with their poles located substantially 90° apart on a circle, leaving a space of substantially 180° between two consecutive poles; a pivot passing through said circle; a transparent bulls eye serving as a tail lamp concentric with said circle; an armature carried by said pivot adapted to be brought opposite each pole at different times and to occupy a mid position in said space when said magnets are not excited; a signal carried by said pivot and moving with said armature; electric circuits through said magnets; and means under the control of the operator for energizing and deënergizing each magnet at will and thereby causing the signal to assume any one of four predetermined positions, substantially as described.

2. In a signal for automobiles the combination of a casing; three electro-magnets in said casing with their poles located substantially 90° apart on a circle, leaving a space of substantially 180° between two consecutive poles; a pivot passing through said circle; a transparent bulls eye serving as a tail lamp concentric with said circle; an armature carried by said pivot adapted to be brought opposite each pole at different times and to occupy a mid position in said space when said magnets are not excited; a signal carried by said pivot and moving with said armature; electric circuits through said magnets; means under the control of the operator for energizing and deënergizing each magnet at will and thereby causing the signal to assume any one of four predetermined positions; a lamp in said casing and an opaque member carrying a transparent member and concentric with said circle and said bulls eye in fixed relation to and adapted to move with said signal, substantially as described.

3. In an automobile signal the combination of a casing; a transparent bulls eye concentric with said casing and serving as a tail lamp in said casing; a pivot on which said bulls eye turns; a lamp for illuminating said bulls eye; an armature carried by said pivot; a plurality of electromagnets for attracting said armature to different predetermined positions, and turning said bulls eye; and a transparent signal member rigid with said bulls eye and adapted to turn with said bulls eye, substantially as described.

4. In an automobile signal the combination of a casing; a transparent bulls eye concentric with said casing serving as a tail lamp in said casing; a pivot on which said bulls eye turns; a lamp for illuminating said bulls eye; a reflector in said casing; an armature carried by said pivot; a plurality of electromagnets for attracting said armature to different predetermined positions, and turning said bulls eye; a transparent signal member rigid with said bulls eye and adapted to turn with said bulls eye; a second signal member in fixed relation to said transparent signal member adapted to be turned with said bulls eye and armature; and means under the control of the operator for energizing each magnet at will, substantially as described.

5. In a signal for automobiles the combination of a casing; three electro-magnets in said casing having their poles located in a circle substantially 90° apart; a pivot member passing through the center of said circle and having an armature rigid therewith; a bulls eye inclosed by said casing serving as a tail lamp fixed to said pivot member and turning therewith; an annular opaque member fixed to said bulls eye and turning with the latter; a transparent member fixed to and turning with said opaque member; and a lamp for illuminating said bulls eye and transparent member during their movements, substantially as described.

6. In a signal for automobiles, the combination of a casing; three electromagnets in said casing having their poles located in a circle substantially 90° apart leaving a neutral position 90° from a pair of said magnets; a pivot member passing through the center of said circle and having an armature rigid therewith; a bulls eye serving as a tail lamp fixed to said pivot member and turning therewith; an annular opaque member fixed to said bulls eye and turning with the latter; a transparent member fixed to and turning with said opaque member; a lamp for illuminating said bulls eye and transparent member during their movements; an opaque signal member fixed to said annual member in fixed relation to said transparent member and turning with the latter; and a plurality of contacts and circuits through said magnets whereby said opaque signal member and said transparent member may at will be brought to any one of four positions indicating right, left, stop or neutral, substantially as described.

7. In a signal apparatus for automobiles the combination of a pair of signals at the front and rear of the machine each comprising a casing; three electro-magnets with their poles located 90° apart on a circle in said casing; a pivot passing through said circle carrying a rotating armature and a rotating bulls eye serving as a tail lamp; an opaque member concentric with and rotating with said bulls eye; a transparent signal carried by said opaque member; an opaque signal in fixed relation to said transparent signal; and a set of contacts under the control of the operator for simultaneously displaying at the front and rear of the machine a plurality of predetermined signals, substantially as described.

8. In a signal for automobiles comprising three electromagnets, located on a circle 90° apart each having a separate circuit corresponding to the signals stop, right and left; an armature adapted to be attracted by said magnets to position 90° apart and corresponding to said signals; a weight carried by said armature adapted to carry the latter to its neutral position when none of said circuits are closed; a contact for controlling each of said circuits; an additional contact for controlling the circuit corresponding to the stop signal; and a lever adapted to occupy a position corresponding to each of said signals and to make circuit successively with each of said contacts; said stop signal contacts being so located that said lever in moving from its neutral position to said stop contacts must close circuit with one of said other magnets, substantially as described.

In testimony whereof I affix my signature in presence of two witnesses.

RAYMOND B. RUDY.

Witnesses:
LEWIS G. SNELL,
FRANCIS C. LING.